A. LOGSDON.
CURTAIN ROD.
APPLICATION FILED JULY 29, 1910.
988,200.
Patented Mar. 28, 1911.
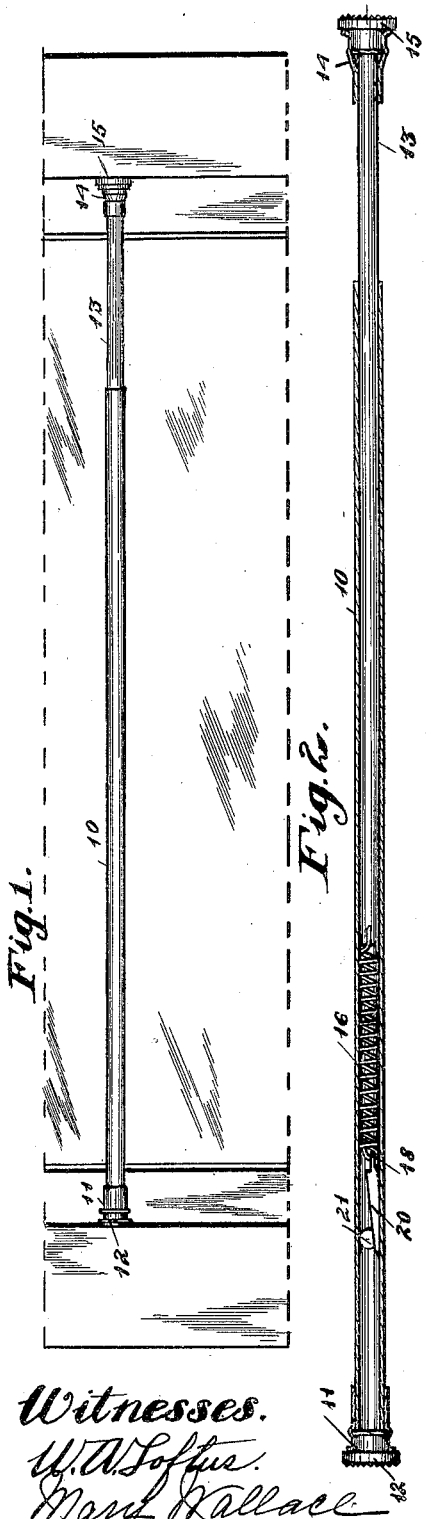

UNITED STATES PATENT OFFICE.

ALFRED LOGSDON, OF PERRY, IOWA, ASSIGNOR TO STAR MANUFACTURING COMPANY, OF PERRY, IOWA, A CORPORATION OF IOWA.

CURTAIN-ROD.

988,200. Specification of Letters Patent. Patented Mar. 28, 1911.

Application filed July 29, 1910. Serial No. 574,482.

*To all whom it may concern:*

Be it known that I, ALFRED LOGSDON, a citizen of the United States, residing at Perry, in the county of Dallas and State of Iowa, have invented a certain new and useful Curtain-Rod, of which the following is a specification.

The object of my invention is to provide a curtain rod of simple, durable and inexpensive construction so arranged that it may be readily, quickly and easily adjusted to any desired length and after adjustment it will be automatically held at the desired length and a yielding pressure in an outward direction be applied to the ends thereof to thereby support the rod against the sides of a wooden frame.

More specifically it is my object to provide an improved ball clutch device connected to one end of an extensible coil spring, the other end of which spring is attached to a rod slidingly mounted within a tube.

My invention consists in certain details, in the construction, arrangement and combination of the various parts of the device, whereby the objects contemplated are attained, as hereinafter more fully set forth pointed out in my claims and illustrated in the accompanying drawings in which:

Figure 1 shows a front view of a portion of a window frame and sash with an improved curtain rod embodying my invention applied to the frame. Fig. 2 shows a central, longitudinal, sectional view of a curtain rod embodying my invention. Fig. 3 shows a perspective view of the ball gripping wedge device, and Fig. 4 shows an enlarged, detail, sectional view of a part of the curtain rod tube with the ball, the wedge and the spring in position therein.

Referring to the accompanying drawings, I have used the reference numeral 10 to indicate a tube forming part of my improved curtain rod. On the outer end of the tube is a socket 11 having a rubber tip 12, the other end of the tube being open. Slidingly mounted within the tube 10 is a rod 13 which may be made either solid or tubular as desired. It is provided on one end with a socket 14 having a rubber tip 15 and it is of such size that it will freely slide within the tube 10. Firmly attached to the inner end of the rod 13 is an extensible coil spring 16 of a size to freely slide within the tube 10. Firmly fixed to the opposite end of the spring 16 is a wedge device comprising a flat body portion 17, an end portion 18 having an opening 19 therein to which the spring is attached and upturned side members 20, which side members are tapered toward the end of the wedge device opposite from the end that is attached to the spring. This wedge device is also capable of freely sliding within the tube 10. Loosely mounted within the tube 10 is a ball 21 of a diameter somewhat less than that of the interior of the tube 10 and of such shape that when it is arranged between the wedge device and the adjacent side of the tube it will coact with the wedge in forming a clutch to thereby firmly lock the wedge device in its position within the tube 10.

In practical use, I first cut the tube 10 and rod 13 to suitable lengths and then apply the sockets and rubber tips. I then secure to the rod 13 the spring 17 which has the wedge device attached to it. I then insert a ball 21 in the tube 10 and I finally insert the wedge and spring and the rod 13 within the tube 10. Obviously all of these parts are of cheap and inexpensive construction and they may be assembled very quickly and easily. Assuming that the parts are in the position shown in Fig. 2, it is obvious that if pressure is applied to the rubber tips in a direction tending to force them toward each other then the ball 21 and the wedge device will coact and grip against the interior of the tube 10 and then if the spring is slightly compressed the curtain rod may be placed against the sides of a window frame, as shown in Fig. 1, and the curtain rod will be yieldingly held in said position by the spring 16. Assuming that it is desired to adjust the curtain rod as to length, then it is removed from the window frame and placed with the closed end of the tube 10 extended downwardly, then the operator pulls upwardly on the rod 13 which removes the wedge device from engagement with the ball and permits the ball to drop into the closed end of the tube 10. When this is done it is obvious that the parts of the curtain rod may be adjusted relative to each other to the desired length. After this is done the operator inverts the curtain rod so that the ball will roll down into position in engagement with the wedge device whereupon the spring may again be compressed and the ends of the curtain rod forced toward each other without moving the ball or wedge device. I have found that, by providing a wedge device with tapered side edges 20, which edges are arranged to engage the sides of the ball 21, a very efficient gripping device is provided as the ball is engaged at three points, to wit: the two side edges 20 and the interior of the tube 10.

I claim as my invention:

1. An improved curtain rod comprising a tubular rod member, a rod member slidingly mounted within the tubular rod member, a spring attached to the second rod member, and a gripping device attached to the spring to coact with the tubular rod member, said gripping member comprising a wedge attached to the spring and a ball designed to coact with said wedge and with the interior of the tubular member.

2. A device of the class described, comprising a tubular rod member, a rod member slidingly mounted within the tubular rod member, an extensible coil spring fixed to said latter rod member, a wedge fixed to the other end of the spring and having upturned tapered edge portions, and a ball loosely mounted within the tubular member and designed to engage said tapered edges of the wedge device and also the interior of the tubular rod member, for the purposes stated.

Des Moines, Iowa, July 11, 1910.

ALFRED LOGSDON.

Witnesses:
H. A. Hoyt,
G. I. Birdsall.

---

Copies of this patent may be obtained for five cents each, by addressing the "Commissioner of Patents, Washington, D. C."